(12) United States Patent
Chen et al.

(10) Patent No.: US 12,368,390 B2
(45) Date of Patent: Jul. 22, 2025

(54) POWER CONVERTER AND MULTI-LEVEL POWER CONVERSION SYSTEM

(71) Applicant: Delta Electronics, Inc., Taoyuan (TW)

(72) Inventors: Hsin-Chih Chen, Taoyuan (TW); Li-Hung Wang, Taoyuan (TW); Chao-Li Kao, Taoyuan (TW); Yi-Ping Hsieh, Taoyuan (TW); Hung-Chieh Lin, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 125 days.

(21) Appl. No.: 18/232,721

(22) Filed: Aug. 10, 2023

(65) Prior Publication Data

US 2024/0364203 A1 Oct. 31, 2024

(30) Foreign Application Priority Data

Apr. 28, 2023 (CN) .......................... 202310483019.5

(51) Int. Cl.
*H02M 7/483* (2007.01)
*H02M 1/38* (2007.01)
(52) U.S. Cl.
CPC ........... *H02M 7/4837* (2021.05); *H02M 1/38* (2013.01); *H02M 7/4833* (2021.05)
(58) Field of Classification Search
CPC . H02M 1/0029; H02M 7/4833; H02M 7/4837
See application file for complete search history.

(56) References Cited

U.S. PATENT DOCUMENTS

| 9,515,617 | B2 | 12/2016 | Hoyerby |
| 11,381,161 | B2 | 7/2022 | Lai et al. |
| 2013/0119961 | A1* | 5/2013 | Okuda ................ H02M 7/4837 323/299 |

(Continued)

FOREIGN PATENT DOCUMENTS

| CN | 102594152 B | 8/2014 |
| CN | 113541473 A | 10/2021 |

(Continued)

OTHER PUBLICATIONS

Sanghun Choi et al., "Capacitor voltage balancing of flying capacitor multilevel converters by space vector PWM", IEEE Transactions on Power Delivery, 27(3): 1154-1161.

(Continued)

*Primary Examiner* — Jue Zhang
(74) *Attorney, Agent, or Firm* — KIRTON McCONKIE; Evan R. Witt

(57) ABSTRACT

A power converter is provided. The power converter includes first to fourth switches electrically connected in series, a flying capacitor and a controller. Positive and negative terminals of the flying capacitor are electrically connected to the second and third switches respectively. The controller operates the first and fourth switches to perform a first complementary switching with a first dead time, and operates the second and third switches to perform a second complementary switching with a second dead time. The controller determines to regulate the first or second dead time by detecting a capacitor voltage of the flying capacitor, such that the capacitor voltage of the flying capacitor is maintained within a balance voltage range.

15 Claims, 13 Drawing Sheets

(56) References Cited

U.S. PATENT DOCUMENTS

| | | | | |
|---|---|---|---|---|
| 2015/0280608 | A1* | 10/2015 | Yoscovich | H02M 7/4833 |
| | | | | 363/131 |
| 2019/0058397 | A1* | 2/2019 | Lazaro | H02M 7/4837 |
| 2022/0224231 | A1 | 7/2022 | Rizzolatti et al. | |
| 2022/0376616 | A1* | 11/2022 | Hu | H02M 3/07 |

FOREIGN PATENT DOCUMENTS

| | | |
|---|---|---|
| CN | 113078820 B | 4/2022 |
| CN | 115149807 A | 10/2022 |
| CN | 113224954 B | 11/2022 |
| DE | 112014003998 T5 | 5/2016 |
| EP | 1562279 A2 | 10/2005 |
| JP | 2016101044 A | 5/2016 |
| TW | 201817148 A | 5/2018 |

OTHER PUBLICATIONS

Chunmei Feng et al., "A novel voltage balancing control method for flying capacitor multilevel converters", IECON'03. 29th Annual Conference of the IEEE Industrial Electronics Society (IEEE Cat. No.03CH37468), Roanoke, VA, USA, 2003, pp. 1179-1184 vol. 2.

David Reusch et al., "Three level buck converter with control and soft startup", 2009 IEEE Energy Conversion Congress and Exposition, San Jose, CA, USA, 2009, pp. 31-35.

S. J. Watkins et al., "Influence of multilevel sinusoidal PWM schemes on the performance of a flying-capacitor inverter", 2002 International Conference on Power Electronics, Machines and Drives (Conf. Publ. No. 487), Sante Fe, NM, USA, 2002, pp. 92-97.

R. M. B. Moritz et al., "Capacitor voltage balancing in a 5-L full-bridge flying capacitor inverter," 2017 Brazilian Power Electronics Conference (COBEP), Juiz de Fora, Brazil, 2017, pp. 1-6.

* cited by examiner

POWER CONVERTER AND MULTI-LEVEL POWER CONVERSION SYSTEM

CROSS-REFERENCE TO RELATED APPLICATION

This application claims priority to China Patent Application No. 202310483019.5, filed on Apr. 28, 2023, and the entire contents of which are incorporated herein by reference for all purposes.

FIELD OF THE INVENTION

The present disclosure relates to a power converter and a multi-level power conversion system, and more particularly to a power converter and a multi-level power conversion system with flying capacitors.

BACKGROUND OF THE INVENTION

When the flying capacitor converter operates under non-ideal status, the voltage of the flying capacitor gradually drifts, which causes the reverse voltage that the switching components bear to increase gradually. If the reverse voltage becomes too large, the switching components may be permanently damaged due to voltage breakdown.

To prevent damage to the switching components, controlling the voltage of the flying capacitor is a necessary condition to maintain normal operation of the converter. In conventional approaches, the switching state is selected according to the current flow direction of the converter based on active vector adjustment. However, in some practical applications, it may be difficult to accurately determine the current direction of the converter. For example, when multiple converters are connected in parallel and operate under light loads, the power of the converters would intermix and render the current direction unstable. In addition, when the current in the converter is really small, it is hard to accurately sample the actual current and to determine the direction thereof. If the current direction determined is incorrect, the direction of adjusting the voltage of the flying capacitor would be reversed, resulting in abnormal operation of the converter.

Therefore, there is a need of providing a power converter and a multi-level power conversion system in order to overcome the drawbacks of the conventional technologies.

SUMMARY OF THE INVENTION

The present disclosure provides a power converter and a multi-level power conversion system in which the dead time of switch is controlled according to the capacitor voltage of the flying capacitor so that the capacitor voltage of the flying capacitor is maintained within a balance voltage range.

In accordance with an aspect of the present disclosure, a power converter is provided. The power converter includes a first switch, a second switch, a third switch, a fourth switch, a flying capacitor and a controller. A first terminal of the second switch is electrically connected to a second terminal of the first switch, a first terminal of the third switch is electrically connected to a second terminal of the second switch, and a first terminal of the fourth switch is electrically connected to a second terminal of the third switch. A positive terminal of the flying capacitor is electrically connected to the first terminal of the second switch, and a negative terminal of the flying capacitor is electrically connected to the second terminal of the third switch. The controller operates the first and fourth switches to perform a first complementary switching with a first dead time, and operates the second and third switches to perform a second complementary switching with a second dead time. A first terminal of the first switch and a second terminal of the fourth switch are electrically connected to a DC input source. The controller determines to regulate the first or second dead time by detecting a capacitor voltage of the flying capacitor, such that the capacitor voltage of the flying capacitor is maintained within a balance voltage range.

In accordance with another aspect of the present disclosure, a multi-level power conversion system is provided. The multi-level power conversion system is configured for switching a DC input source and includes a plurality of power converters and a controller. Each power converter includes a first switch, a second switch, a third switch, a fourth switch and a flying capacitor. A first terminal of the second switch is electrically connected to a second terminal of the first switch, a first terminal of the third switch is electrically connected to a second terminal of the second switch, a first terminal of the fourth switch is electrically connected to a second terminal of the third switch, and a first terminal of the first switch and a second terminal of the fourth switch are electrically connected to the DC input source. A positive terminal of the flying capacitor is electrically connected to the first terminal of the second switch, and a negative terminal of the flying capacitor is electrically connected to the second terminal of the third switch. The controller performs a balance voltage control method to operate each of the plurality of power converters. The balance voltage control method includes: operating the first and fourth switches to perform a first complementary switching with a first dead time; operating the second and third switches to perform a second complementary switching with a second dead time; and determining to regulate the first or second dead time by detecting a capacitor voltage of the flying capacitor, such that the capacitor voltage of the flying capacitor is maintained within a balance voltage range.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
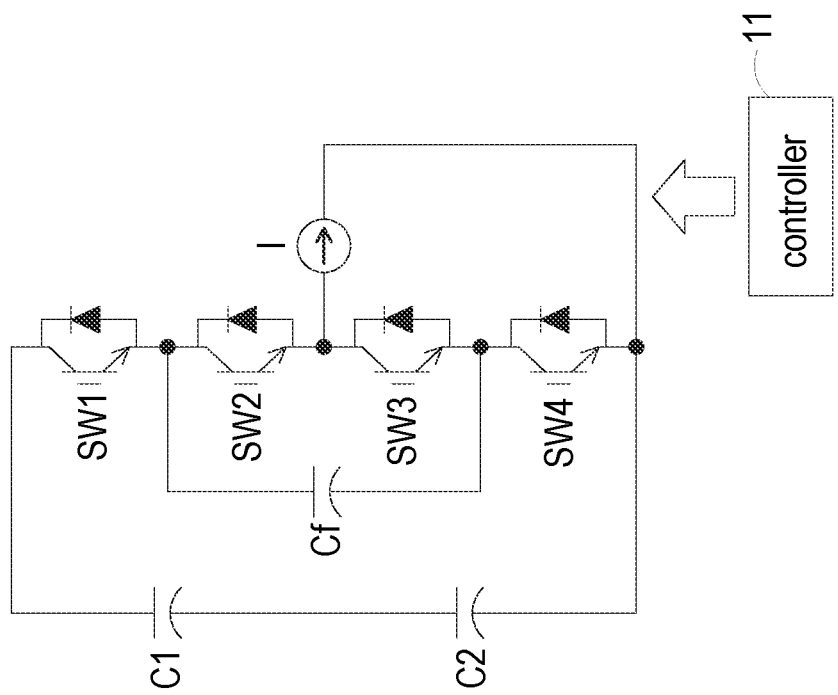
FIG. 1 is a schematic circuit diagram illustrating a power converter according to an embodiment of the present disclosure.

FIG. 1 is a schematic circuit diagram illustrating a power converter according to an embodiment of the present disclosure. As shown in FIG. 1, the power converter 1 includes a first switch SW1, a second switch SW2, a third switch SW3, a fourth switch SW4, a flying capacitor Cf and a controller 11.

A first terminal of the first switch SW1 is electrically connected to a first terminal of a DC input source, a first terminal of the second switch SW2 is electrically connected to a second terminal of the first switch SW1, a first terminal of the third switch SW3 is electrically connected to a second terminal of the second switch SW2, and first and second terminals of the fourth switch SW4 are electrically connected to a second terminal of the third switch SW3 and a second terminal of the DC input source respectively. In an embodiment, the DC input source includes a series capacitor (for example but not limited to the capacitors C1 and C2 shown in FIG. 1), and positive and negative terminals of the series capacitor are electrically connected to the first terminal of the first switch SW1 and the second terminal of the fourth switch SW4 respectively. In an embodiment, the second terminal of the second switch SW2 and the second terminal of the fourth switch SW4 are electrically coupled to a load (not shown).

A positive terminal of the flying capacitor Cf is electrically connected to the first terminal of the second switch SW2, and a negative terminal of the flying capacitor Cf is electrically connected to the second terminal of the third switch SW3. In addition, the direction of the current I in power converter 1 is flowing out from the second terminal of the second switch SW2 or the first terminal of the third switch SW3 in the example shown in FIG. 1, but not limited thereto. In another example, the direction of the current I may be flowing into the second terminal of the second switch SW2 or the first terminal of the third switch SW3.

The controller 11 operates the first switch SW1 and the fourth switch SW4 to perform a first complementary switching with a first dead time, and operates the second switch SW2 and the third switch SW3 to perform a second complementary switching with a second dead time. During the first dead time, both the first switch SW1 and the fourth switch SW4 are turned off. During the second dead time, both the second switch SW2 and the third switch SW3 are turned off. Further, the first dead time and the second dead time do not overlap with each other.

The controller 11 determines to regulate the first or second dead time by detecting a capacitor voltage of the flying capacitor Cf, such that the capacitor voltage of the flying capacitor Cf is maintained within a balance voltage range.

Figure 2A:
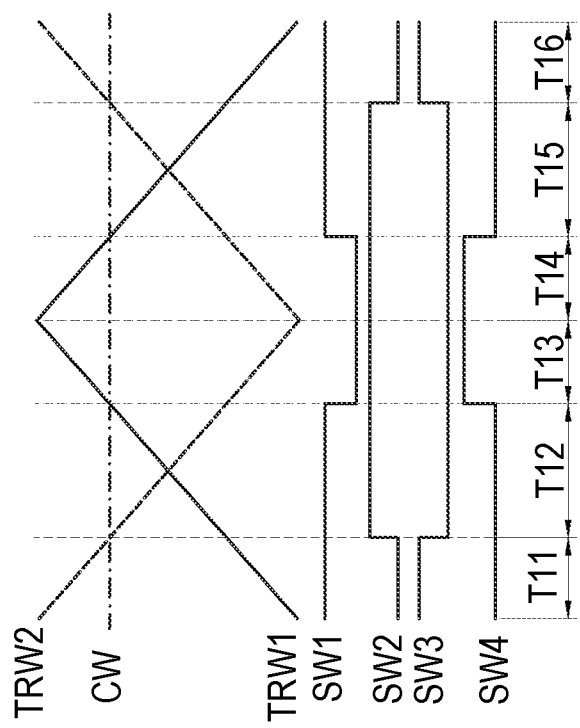
FIG. 2A is a schematic oscillogram of the power converter of FIG. 1 with no dead time and a duty ratio greater than 0.5.
Figure 2B:
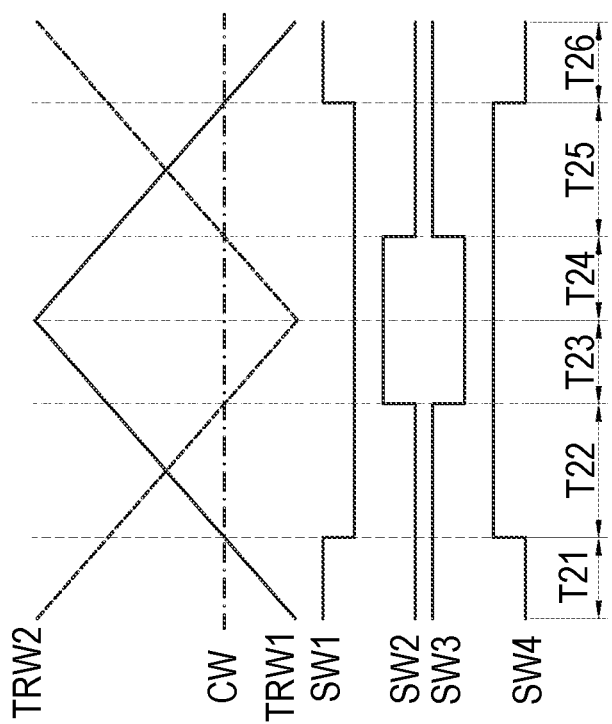
FIG. 2B is a schematic oscillogram of the power converter of FIG. 1 with no dead time and a duty ratio less than 0.5.

FIG. 2A is a schematic oscillogram of the power converter of FIG. 1 with no dead time and a duty ratio greater than 0.5. FIG. 2B is a schematic oscillogram of the power converter of FIG. 1 with no dead time and a duty ratio less than 0.5. In FIG. 2A and FIG. 2B, the working waveforms in one switching cycle are shown, TRW1, TRW2 and CW represent a first triangle wave, a second triangle wave and a carrier wave, respectively, depicted by solid lines, dashed lines, and dotted chain lines respectively, and SW1, SW2, SW3 and SW4 represent the control signals of the first switch SW1, the second switch SW2, the third switch SW3, and the fourth switch SW4 respectively. The controller 11 generates the first triangle wave TRW1 and the second triangle wave TRW2, and through comparing the first triangle wave TRW1 and the second triangle wave TRW2 with the carrier wave CW, the controller 11 generates PWM (pulse width modulation) signals to selectively turn on or off the first switch SW1, the second switch SW2, the third switch SW3 and the fourth switch SW4. The first triangle wave TRW1 and the second triangle wave TRW2 are out of phase with each other by 180 degrees. In specific, when the first triangle wave TRW1 is less than the carrier wave CW, the first switch SW1 is turned on, and the fourth switch SW4 is turned off. Conversely, when the first triangle wave TRW1 is greater than the carrier wave CW, the first switch SW1 is turned off, and the fourth switch SW4 is turned on. Similarly, when the second triangle wave TRW2 is less than the carrier wave CW, the second switch SW2 is turned on, and the third switch SW3 is turned off. Conversely, when the second triangle wave TRW2 is greater than the carrier wave CW, the second switch SW2 is turned off, and the third switch SW3 is turned on.

Please refer to FIG. 2A with FIG. 1. When the carrier wave CW is greater than a first predetermined voltage, the duty ratio of the power converter 1 is greater than 0.5 (i.e., the ratio of the output voltage to the bus voltage of the power converter 1 is greater than 0.5), and the first switch SW1 and the second switch SW2 would not be turned off simultaneously in the switching time sequence. Under the circumstance that the current direction of the current I in power converter 1 is flowing out from the second terminal of the second switch SW2 or the first terminal of the third switch SW3. In the first half of the switching cycle, during the first time segment T11, the first and third switches SW1 and SW3 are turned on, the second and fourth switches SW2 and SW4 are turned off, and thus the flying capacitor Cf is charged. During the second time segment T12, the first and second switches SW1 and SW2 are turned on, the third and fourth switches SW3 and SW4 are turned off, and the flying capacitor Cf is not charged or discharged since the current does not flow through the flying capacitor Cf. During the third time segment T13, the second and fourth switches SW2 and SW4 are turned on, the first and third switches SW1 and SW3 are turned off, and thus the flying capacitor Cf is discharged. Symmetrically, in the second half of the switching cycle, the flying capacitor Cf is discharged during the fourth time segment T14, the flying capacitor Cf is not charged or discharged during the fifth time segment T15, and the flying capacitor Cf is charged during the sixth time segment T16. Similarly, with the current direction of the current I in power converter 1 flowing into the second terminal of the second switch SW2 or the first terminal of the third switch SW3, the flying capacitor Cf is discharged during the first and sixth time segments T11 and T16, the flying capacitor Cf is not charged or discharged during the second and fifth time segments T12 and T15, and the flying capacitor Cf is charged during the third and fourth time segments T13 and T14.

Please refer to FIG. 2B with FIG. 1. When the carrier wave CW is less than the first predetermined voltage, the duty ratio of the power converter 1 is less than 0.5 (i.e., the ratio of the output voltage to the bus voltage of the power converter 1 is less than 0.5), and the first switch SW1 and the second switch SW2 would be turned off simultaneously in at a least a part of the switching time sequence. Under the circumstance that the current direction of the current I in power converter 1 is flowing out from the second terminal of the second switch SW2 or the first terminal of the third switch SW3. In the first half of the switching cycle, during the first time segment T21, the first and third switches SW1 and SW3 are turned on, the second and fourth switches SW2 and SW4 are turned off, and thus the flying capacitor Cf is charged. During the second time segment T22, the first and second switches SW1 and SW2 are turned off, the third and fourth switches SW3 and SW4 are turned on, and the flying capacitor Cf is not charged or discharged since the current does not flow through the flying capacitor Cf. During the third time segment T23, the second and fourth switches SW2 and SW4 are turned on, the first and third switches SW1 and SW3 are turned off, and thus the flying capacitor Cf is discharged. Symmetrically, in the second half of the switching cycle, the flying capacitor Cf is discharged during the fourth time segment T24, the flying capacitor Cf is not charged or discharged during the fifth time segment T25, and the flying capacitor Cf is charged during the sixth time segment T26. Similarly, with the current direction of the current I in power converter 1 flowing into the second terminal of the second switch SW2 or the first terminal of the third switch SW3, the flying capacitor Cf is discharged during the first and sixth time segments T21 and T26, the flying capacitor Cf is not charged or discharged during the second and fifth time segments T22 and T25, and the flying capacitor Cf is charged during the third and fourth time segments T23 and T24.

The impact of introducing dead time on the power converter 1 would be described as follows.

Figure 4:
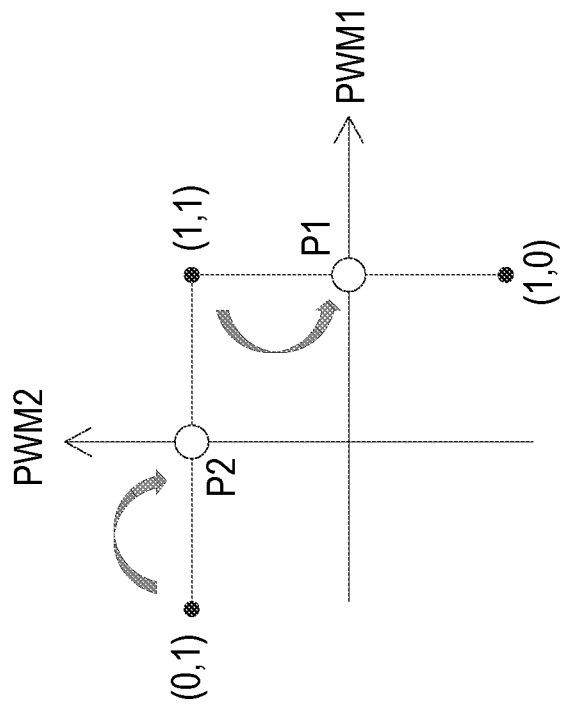
FIG. 4 schematically shows the variation of switching states corresponding to the waveforms shown in FIG. 3.
Figure 3:
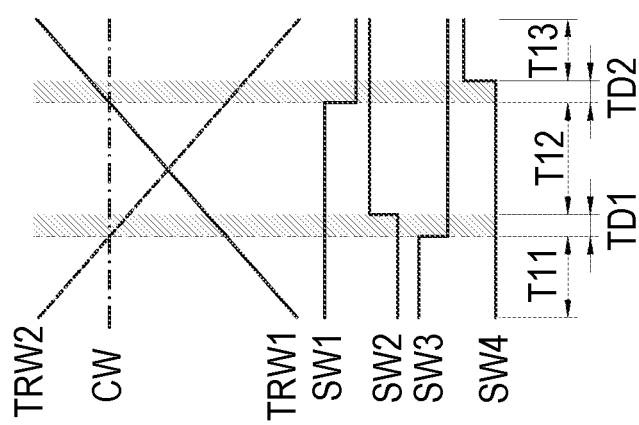
FIG. 3 is a schematic oscillogram of the power converter of FIG. 1 with dead times and a duty ratio greater than 0.5 in a half switching cycle.

Please refer to FIG. 3 and FIG. 4. FIG. 3 is a schematic oscillogram of the power converter of FIG. 1 with dead times and a duty ratio greater than 0.5 in a half switching cycle. FIG. 4 schematically shows the variation of switching states corresponding to the waveforms shown in FIG. 3. The PWM signals generated by the controller 11 includes a first PWM signal PWM1 and a second PWM signal PWM2. When the first PWM signal PWM1 is 1, the first and fourth switches SW1 and SW4 are turned on and off respectively, and when the first PWM signal PWM1 is 0, the first and fourth switches SW1 and SW4 are turned off and on respectively. When the second PWM signal PWM2 is 1, the second and third switches SW2 and SW3 are turned on and off respectively, and when the second PWM signal PWM2 is 0, the second and third switches SW2 and SW3 are turned off and on respectively.

In FIG. 3 and FIG. 4, the point (1, 0) corresponds to the switching state of the first time segment T11, the point (1, 1) corresponds to the switching state of the second time segment T12, the point (0, 1) corresponds to the switching state of the third time segment T13, the point P1 corresponds to the switching state of the second dead time TD1, and the point P2 corresponds to the switching state of the first dead time TD2. Compared with the implementation without dead time, the second time segment T12 is reduced by a time length which is used as the second dead time TD1, and the third time segment T13 is reduced by a time length which is used as the first dead time TD2.

Figure 5A:
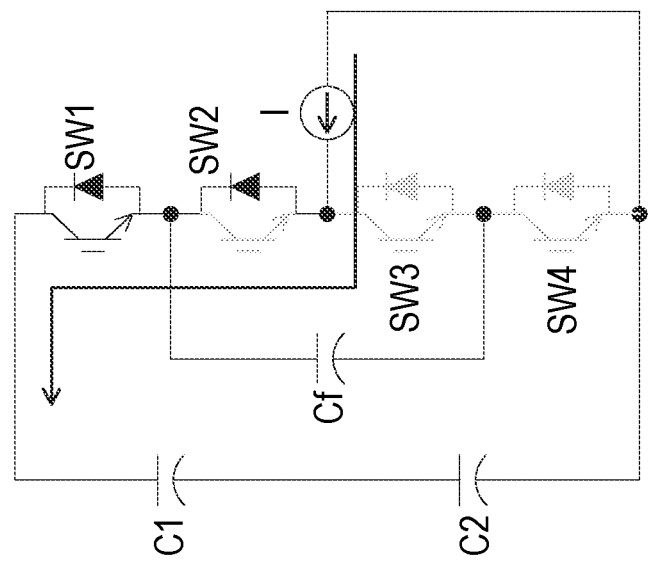
FIG. 5A and FIG. 5B schematically show the switching state and current path of the power converter of FIG. 1 during the second dead time TD1 shown in FIG. 3.
Figure 5B:
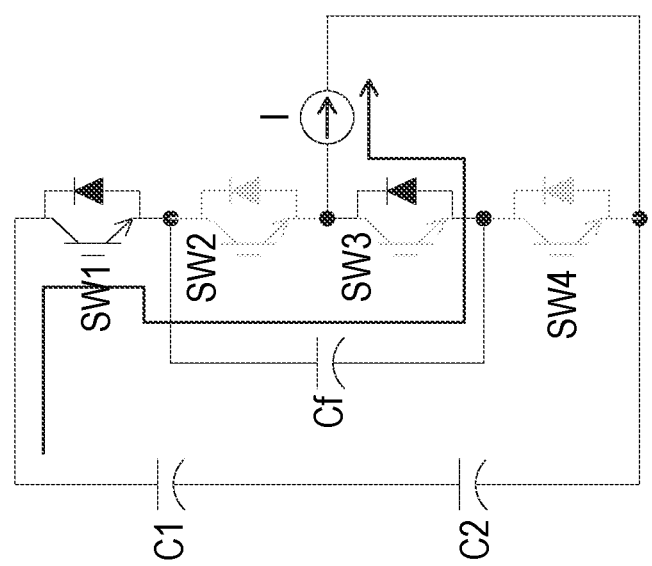

If there is no dead time introduced, the variation of the switching states of the power converter 1 corresponds to the point (1, 0), the point (1, 1) and point (0, 1) in sequence. While with the dead time introduced, the direction of the current I in the power converter 1 during the dead time would determine the succeeding switching state. In specific, under the switching state of the second dead time TD1 corresponding to the point P1, the first switch SW1 is turned on, and the second, third and fourth switches SW2, SW3 and SW4 are turned off. In this case, if the direction of the current I is flowing out from the second terminal of the second switch SW2 or the first terminal of the third switch SW3 (as shown in FIG. 5A), the current I flows through the parasitic diode of the third switch SW3 so that the power converter 1 returns to the switching state of the first time segment T11 corresponding to the point (1, 0), and thus the charging time of the flying capacitor Cf is increased. On the contrary, if the direction of the current I is flowing into the second terminal of the second switch SW2 or the first terminal of the third switch SW3 (as shown in FIG. 5B), the current I flows through the parasitic diode of the second switch SW2 so that the power converter 1 changes to the switching state of the second time segment T12 corresponding to the point (1, 1), and thus the charging and discharging time of the flying capacitor Cf remains unchanged.

Figure 6A:
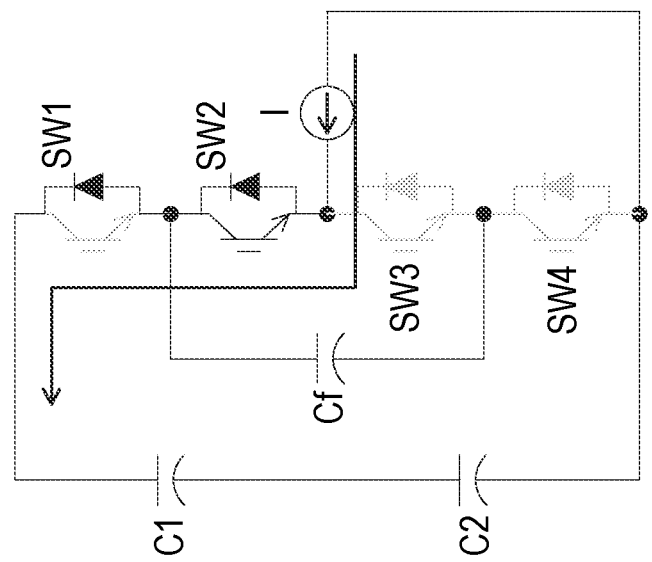
FIG. 6A and FIG. 6B schematically show the switching state and current path of the power converter of FIG. 1 during the first dead time TD2 shown in FIG. 3.
Figure 6B:
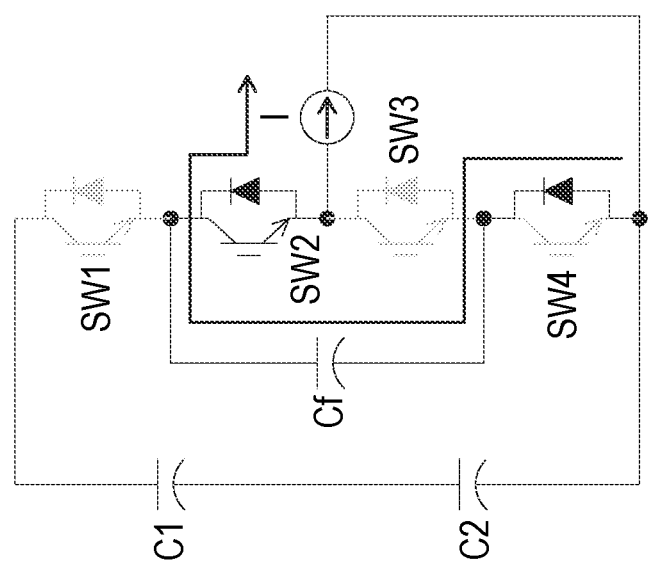

Under the switching state of the first dead time TD2 corresponding to the point P2, the second switch SW2 is turned on, and the first, third and fourth switches SW1, SW3 and SW4 are turned off. In this case, if the direction of the current I is flowing out from the second terminal of the second switch SW2 (as shown in FIG. 6A), the current I flows through the parasitic diode of the fourth switch SW4 so that the power converter 1 changes to the switching state of the third time segment T13 corresponding to the point (0, 1), and thus the charging and discharging time of the flying capacitor Cf remains unchanged. On the contrary, if the direction of the current I is flowing into the second terminal of the second switch SW2 (as shown in FIG. 6B), the current I flows through the parasitic diode of the first switch SW1 so that the power converter 1 returns to the switching state of the second time segment T12 corresponding to the point (1, 1), and thus the charging time of the flying capacitor Cf is decreased.

Figure 8:
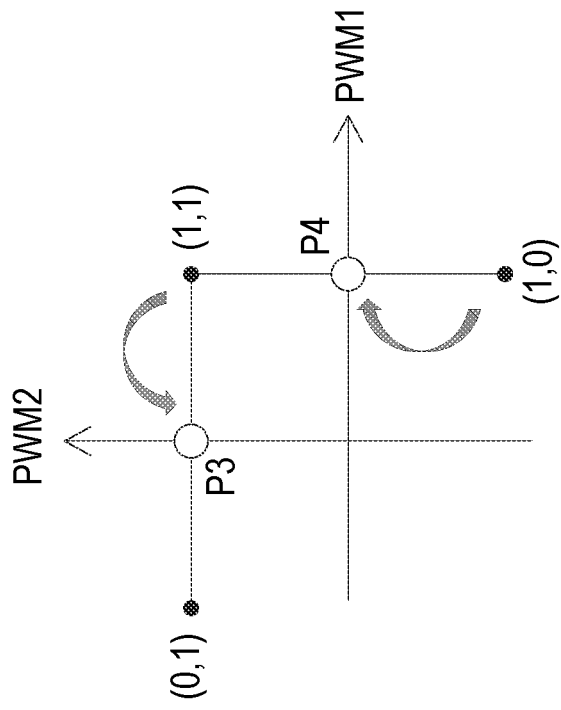
FIG. 8 schematically shows the variation of switching states corresponding to the waveforms shown in FIG. 7.
Figure 7:
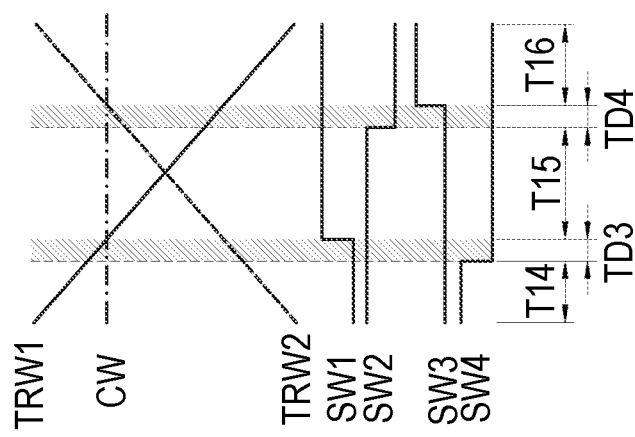
FIG. 7 is a schematic oscillogram of the power converter of FIG. 1 with dead times and a duty ratio greater than 0.5 in the other half switching cycle.

Please refer to FIG. 7 and FIG. 8. FIG. 7 is a schematic oscillogram of the power converter of FIG. 1 with dead times and a duty ratio greater than 0.5 in the other half switching cycle. FIG. 8 schematically shows the variation of switching states corresponding to the waveforms shown in FIG. 7. In FIG. 7 and FIG. 8, the point (0, 1) corresponds to the switching state of the fourth time segment T14, the point (1, 1) corresponds to the switching state of the fifth time segment T15, the point (1, 0) corresponds to the switching state of the sixth time segment T16, the point P3 corresponds to the switching state of the first dead time TD3, and the point P4 corresponds to the switching state of the second dead time TD4. Compared with the implementation without dead time, the fifth time segment T15 is reduced by a time length which is used as the first dead time TD3, and the sixth time segment T16 is reduced by a time length which is used as the second dead time TD4.

If there is no dead time introduced, the variation of the switching states of the power converter 1 corresponds to the point (0, 1), the point (1, 1) and point (1, 0) in sequence. While with the dead time introduced, the direction of the current I in the power converter 1 during the dead time would determine the succeeding switching state. In specific, under the switching state of the first dead time TD3 corresponding to the point P3, the second switch SW2 is turned on, and the first, third and fourth switches SW1, SW3 and SW4 are turned off. In this case, if the direction of the current I is flowing out from the second terminal of the second switch SW2, the current I flows through the parasitic diode of the fourth switch SW4 so that the power converter 1 returns to the switching state of the fourth time segment T14 corresponding to the point (0, 1), and thus the discharging time of the flying capacitor Cf is increased. On the contrary, if the direction of the current I is flowing into the second terminal of the second switch SW2, the current I flows through the parasitic diode of the first switch SW1 so that the power converter 1 changes to the switching state of the fifth time segment T15 corresponding to the point (1, 1), and thus the charging and discharging time of the flying capacitor Cf remains unchanged.

Under the switching state of the second dead time TD4 corresponding to the point P4, the first switch SW1 is turned on, and the second, third and fourth switches SW2, SW3 and SW4 are turned off. In this case, if the direction of the current I is flowing out from the second terminal of the second switch SW2 or the first terminal of the third switch SW3, the current I flows through the parasitic diode of the third switch SW3 so that the power converter 1 changes to the switching state of the sixth time segment T16 corresponding to the point (1, 0), and thus the charging and discharging time of the flying capacitor Cf remains unchanged. On the contrary, if the direction of the current I is flowing into the second terminal of the second switch SW2 or the first terminal of the third switch SW3, the current I flows through the parasitic diode of the second switch SW2 so that the power converter 1 returns to the switching state of the fifth time segment T15 corresponding to the point (1, 1), and thus the discharging time of the flying capacitor Cf is decreased.

According to the above descriptions, under the circumstance that the duty ratio of power converter 1 is greater than 0.5, if the direction of the current I is flowing out from the second terminal of the second switch SW2 or the first terminal of the third switch SW3, the existence of the second dead time TD1 increases the charging time of flying capacitor Cf, the existence of the first dead time TD2 does not affect the charging and discharging time of flying capacitor Cf, the existence of the first dead time TD3 increases the discharging time of flying capacitor Cf, and the existence of the second dead time TD4 does not affect the charging and discharging time of flying capacitor Cf. If the direction of the current I is flowing into the second terminal of the second switch SW2 or the first terminal of the third switch SW3, the existence of the second dead time TD1 does not affect the charging and discharging time of flying capacitor Cf, the existence of the first dead time TD2 decreases the charging time of flying capacitor Cf, the existence of the first dead time TD3 does not affect the charging and discharging time of flying capacitor Cf, and the existence of the second dead time TD4 decreases the discharging time of flying capacitor Cf.

Consequently, for the overall switching cycle, when the duty ratio of power converter 1 is greater than 0.5, no matter what the direction of current I is, the existence of the first dead times TD2 and TD3 decreases the capacitor voltage of the flying capacitor Cf, and the existence of the second dead times TD1 and TD4 increases the capacitor voltage of the flying capacitor Cf.

Figure 10:
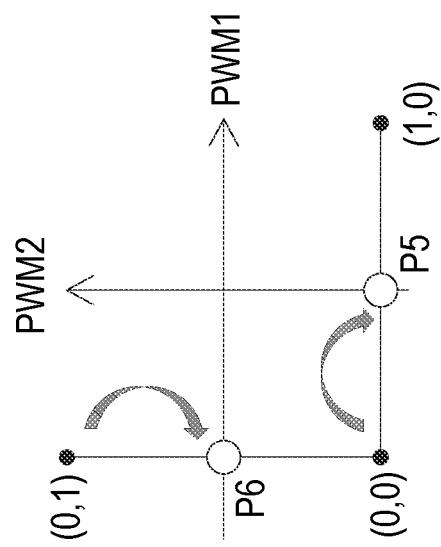
FIG. 10 schematically shows the variation of switching states corresponding to the waveforms shown in FIG. 9.
Figure 9:
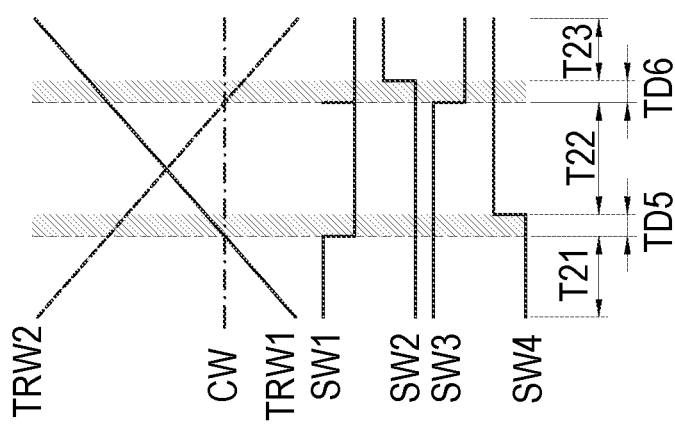
FIG. 9 is a schematic oscillogram of the power converter of FIG. 1 with dead times and a duty ratio less than 0.5 in a half switching cycle.

Please refer to FIG. 9 and FIG. 10. FIG. 9 is a schematic oscillogram of the power converter of FIG. 1 with dead times and a duty ratio less than 0.5 in a half switching cycle. FIG. 10 schematically shows the variation of switching states corresponding to the waveforms shown in FIG. 9. In FIG. 9 and FIG. 10, the point (1, 0) corresponds to the switching state of the first time segment T21, the point (0, 0) corresponds to the switching state of the second time segment T22, the point (0, 1) corresponds to the switching state of the third time segment T23, the point P5 corresponds to the switching state of the first dead time TD5, and the point P6 corresponds to the switching state of the second dead time TD6. Compared with the implementation without dead time, the second time segment T22 is reduced by a time length which is used as the first dead time TD5, and the third time segment T23 is reduced by a time length which is used as the second dead time TD6.

Figure 11B:
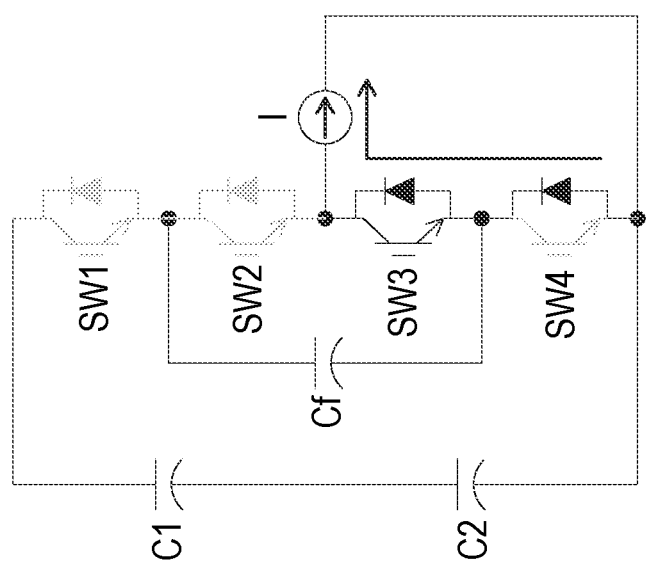
FIG. 11A and FIG. 11B schematically show the switching state and current path of the power converter of FIG. 1 during the first dead time TD5 shown in FIG. 9.
Figure 11A:
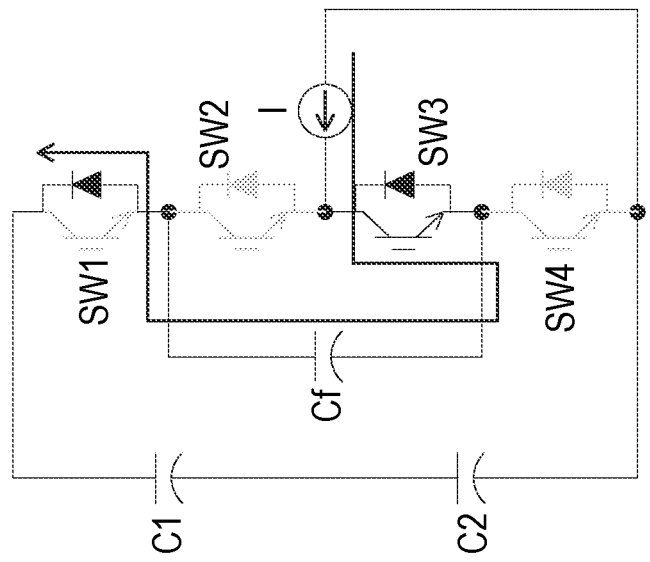

If there is no dead time introduced, the variation of the switching states of the power converter 1 corresponds to the point (1, 0), the point (0, 0) and point (0, 1) in sequence. While with the dead time introduced, the direction of the current I in the power converter 1 during the dead time would determine the succeeding switching state. In specific, under the switching state of the first dead time TD5 corresponding to the point P5, the third switch SW3 is turned on, and the first, second and fourth switches SW1, SW2 and SW4 are turned off. In this case, if the direction of the current I is flowing out from the first terminal of the third switch SW3 (as shown in FIG. 11A), the current I flows through the parasitic diode of the fourth switch SW4 so that the power converter 1 changes to the switching state of the second time segment T22 corresponding to the point (0, 0), and thus the charging and discharging time of the flying capacitor Cf remains unchanged. On the contrary, if the direction of the current I is flowing into the first terminal of the third switch SW3 (as shown in FIG. 11B), the current I flows through the parasitic diode of the first switch SW1 so that the power converter 1 returns to the switching state of the first time segment T21 corresponding to the point (1, 0), and thus the discharging time of the flying capacitor Cf is increased.

Figure 12B:
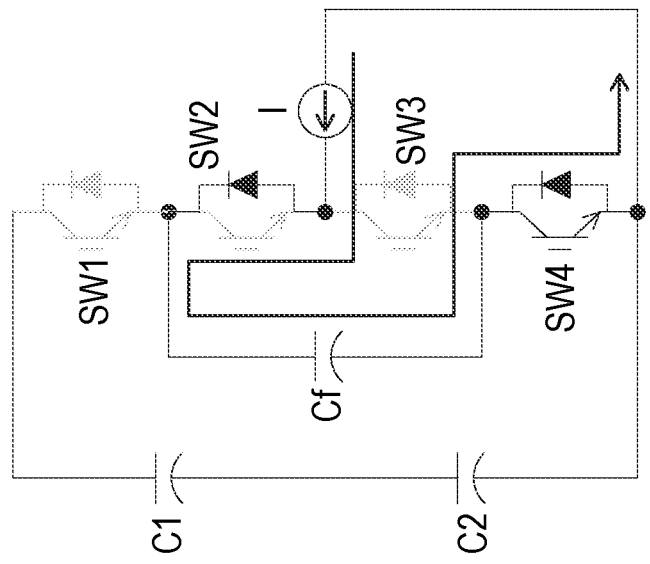
FIG. 12A and FIG. 12B schematically show the switching state and current path of the power converter of FIG. 1 during the second dead time TD6 shown in FIG. 3.
Figure 12A:
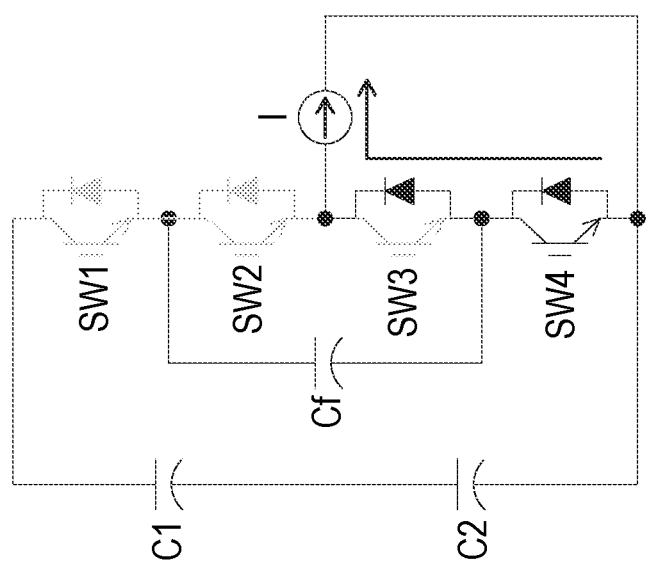

Under the switching state of the second dead time TD6 corresponding to the point P6, the fourth switch SW4 is turned on, and the first, second and third switches SW1, SW2 and SW3 are turned off. In this case, if the direction of the current I is flowing out from the second terminal of the second switch SW2 or the first terminal of the third switch SW3 (as shown in FIG. 12A), the current I flows through the parasitic diode of the third switch SW3 so that the power converter 1 returns to the switching state of the second time segment T22 corresponding to the point (0, 0), and thus the discharging time of the flying capacitor Cf is decreased. On the contrary, if the direction of the current I is flowing into the second terminal of the second switch SW2 or the first terminal of the third switch SW3 (as shown in FIG. 12B), the current I flows through the parasitic diode of the second switch SW2 so that the power converter 1 changes to the switching state of the third time segment T23 corresponding to the point (0, 1), and thus the charging and discharging time of the flying capacitor Cf remains unchanged.

Figure 14:
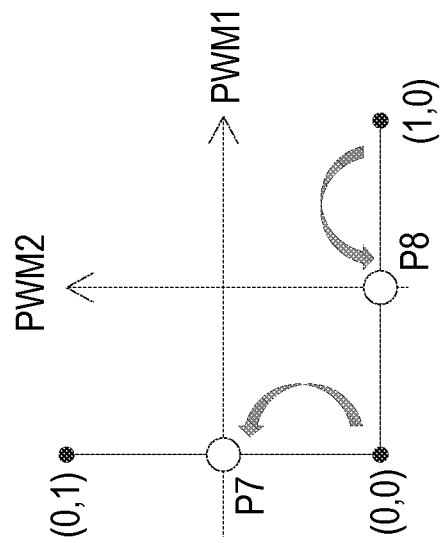
FIG. 14 schematically shows the variation of switching states corresponding to the waveforms shown in FIG. 13.
Figure 13:
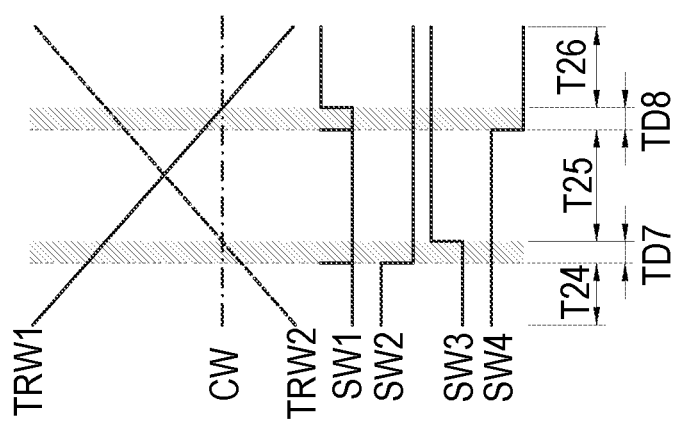
FIG. 13 is a schematic oscillogram of the power converter of FIG. 1 with dead times and a duty ratio less than 0.5 in the other half switching cycle.

Please refer to FIG. 13 and FIG. 14. FIG. 13 is a schematic oscillogram of the power converter of FIG. 1 with dead times and a duty ratio less than 0.5 in the other half switching cycle. FIG. 14 schematically shows the variation of switching states corresponding to the waveforms shown in FIG. 13. In FIG. 13 and FIG. 14, the point (0, 1) corresponds to the switching state of the fourth time segment T24, the point (0, 0) corresponds to the switching state of the fifth time segment T25, the point (1, 0) corresponds to the switching state of the sixth time segment T26, the point P7 corresponds to the switching state of the second dead time TD7, and the point P8 corresponds to the switching state of the first dead time TD8. Compared with the implementation without dead time, the fifth time segment T25 is reduced by a time length which is used as the second dead time TD7, and the sixth time segment T26 is reduced by a time length which is used as the first dead time TD8.

If there is no dead time introduced, the variation of the switching states of the power converter 1 corresponds to the point (0, 1), the point (1, 1) and point (1, 0) in sequence. While with the dead time introduced, the direction of the current I in the power converter 1 during the dead time would determine the succeeding switching state. In specific, under the switching state of the second dead time TD7 corresponding to the point P7, the fourth switch SW4 is turned on, and the first, second and third switches SW1, SW2 and SW3 are turned off. In this case, if the direction of the current I is flowing out from the second terminal of the second switch SW2 or the first terminal of the third switch SW3, the current I flows through the parasitic diode of the third switch SW3 so that the power converter 1 changes to the switching state of the fifth time segment T25 corresponding to the point (0, 0), and thus the charging and discharging time of the flying capacitor Cf remains unchanged. On the contrary, if the direction of the current I is flowing into the second terminal of the second switch SW2 or the first terminal of the third switch SW3, the current I flows through the parasitic diode of the second switch SW2 so that the power converter 1 returns to the switching state of the fourth time segment T24 corresponding to the point (0, 1), and thus the charging time of the flying capacitor Cf is increased.

Under the switching state of the first dead time TD8 corresponding to the point P8, the third switch SW3 is turned on, and the first, second and fourth switches SW1, SW2 and SW4 are turned off. In this case, if the direction of the current I is flowing out from the first terminal of the third switch SW3, the current I flows through the parasitic diode of the fourth switch SW4 so that the power converter 1 returns to the switching state of the fifth time segment T25 corresponding to the point (0, 0), and thus the charging time of the flying capacitor Cf is decreased. On the contrary, if the direction of the current I is flowing into the first terminal of the third switch SW3, the current I flows through the parasitic diode of the first switch SW1 so that the power converter 1 changes to the switching state of the sixth time segment T26 corresponding to the point (1, 0), and thus the charging and discharging time of the flying capacitor Cf remains unchanged.

According to the above descriptions, under the circumstance that the duty ratio of power converter 1 is less than 0.5, if the direction of the current I is flowing out from the second terminal of the second switch SW2 or the first terminal of the third switch SW3, the existence of the first dead time TD5 does not affect the charging and discharging time of flying capacitor Cf, the existence of the second dead time TD6 decreases the discharging time of flying capacitor Cf, the existence of the second dead time TD7 does not affect the charging and discharging time of flying capacitor Cf, and the existence of the first dead time TD8 decreases the charging time of flying capacitor Cf. If the direction of the current I is flowing into the second terminal of the second switch SW2 or the first terminal of the third switch SW3, the existence of the first dead time TD5 increases the discharging time of flying capacitor Cf, the existence of the second dead time TD6 does not affect the charging and discharging time of flying capacitor Cf, the existence of the second dead time TD7 increases the charging time of flying capacitor Cf, and the existence of the first dead time TD8 does not affect the charging and discharging time of flying capacitor Cf.

Consequently, for the overall switching cycle, when the duty ratio of power converter 1 is less than 0.5, no matter what the direction of current I is, the existence of the first dead times TD5 and TD8 decreases the capacitor voltage of the flying capacitor Cf, and the existence of the second dead times TD6 and TD7 increases the capacitor voltage of the flying capacitor Cf.

In conclusion, in a switching cycle, no matter what the duty ratio of power converter 1 and the direction of current I are, the existence of the first dead time decreases the capacitor voltage of the flying capacitor Cf, and the existence of the second dead time increases the capacitor voltage of the flying capacitor Cf. Accordingly, through regulating the first dead time and/or the second dead time, the controller 11 may vary the capacitor voltage of flying capacitor Cf to maintain the capacitor voltage of flying capacitor Cf within a balance voltage range. Further, since the direction of the current I in the power converter 1 during the dead time would determine the succeeding switching state, the present disclosure does not need to detect the current direction and control the switching state actively.

In an embodiment, the controller 11 compares the capacitor voltage of the flying capacitor Cf with a second predetermined voltage. If the capacitor voltage detected by the controller 11 is lower than the second predetermined voltage, the controller 11 determines that the flying capacitor Cf is undervoltage. Therefore, the controller 11 regulates the second dead time correspondingly to charge the flying capacitor Cf and increase its capacitor voltage. Conversely, if the capacitor voltage detected by the controller 11 is higher than the second predetermined voltage, the controller 11 determines that the flying capacitor Cf is overvoltage. Therefore, the controller 11 regulates the first dead time correspondingly to discharge the flying capacitor Cf and decrease its capacitor voltage.

Figure 15:
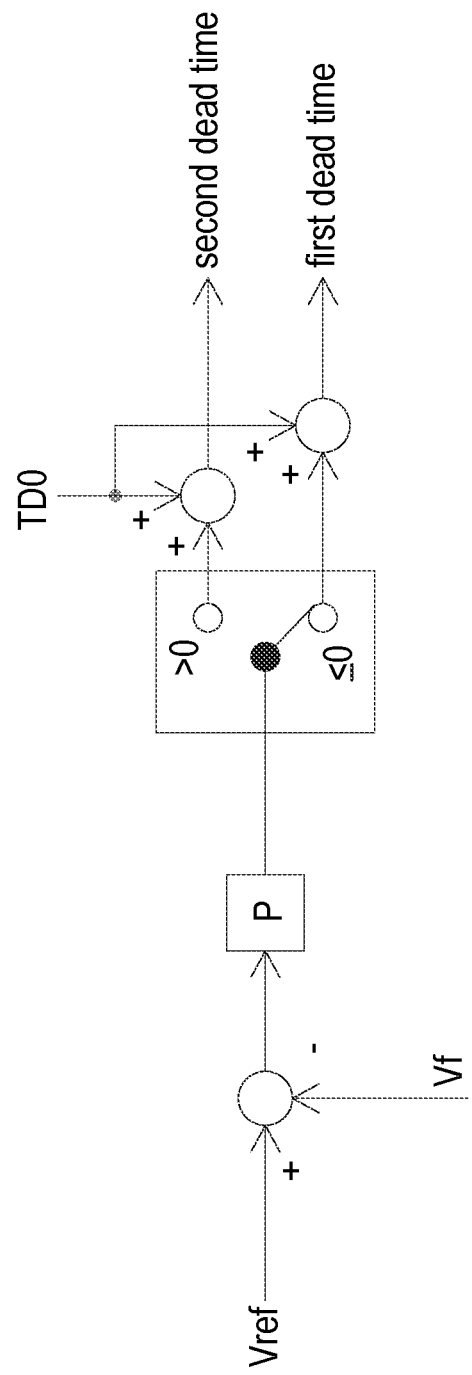
FIG. 15 schematically shows a specific implementation of the controller regulating the dead time.

FIG. 15 schematically shows a specific implementation of the controller regulating the dead time. In this implementation, as shown in FIG. 15, the controller 11 subtracts the capacitor voltage Vf of flying capacitor Cf from the second predetermined voltage Vref to acquire a difference, and performs a proportional operation on the difference to generate a corresponding adjustment value. If the capacitor voltage Vf is lower than the second predetermined voltage Vref, the difference is greater than zero, and the controller 11 generates an adjustment value for the second dead time and generates an actual second dead time by adding the adjustment value to the initial length TD0 of dead time. Conversely, if the capacitor voltage Vf is higher than or equal to the second predetermined voltage Vref, the difference is less than or equal to zero, the controller 11 generates an adjustment value for the first dead time and generates an actual first dead time by adding the adjustment value to the initial length TD0 of dead time. In addition, the second predetermined voltage Vref is for example but not limited to a half of the bus voltage of the power converter 1.

Of course, the specific manner of the controller 11 regulating the first dead time and/or the second dead time is not limited to that shown in above embodiments and may be adjusted according to actual requirements.

Figure 16:
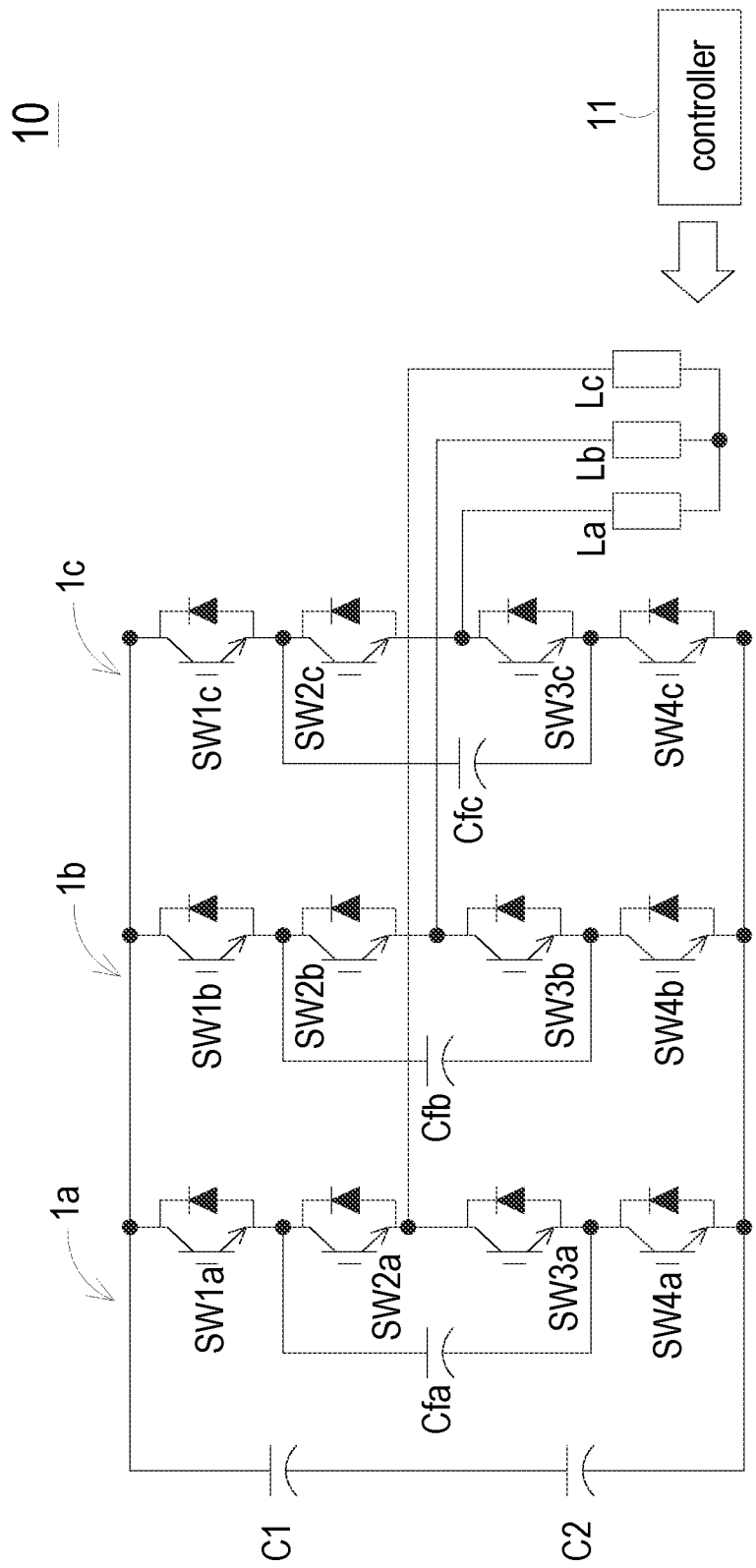
FIG. 16 is a schematic circuit diagram illustrating a multi-level power conversion system according to an embodiment of the present disclosure.

FIG. 16 is a schematic circuit diagram illustrating a multi-level power conversion system according to an embodiment of the present disclosure. As shown in FIG. 16, the multi-level power conversion system 10 is configured to switch a DC input source and includes a plurality of power converters (for example but not limited to the three power converters 1a, 1b and 1c shown in the figure) and a controller 11. The structure and operation of each power converter are the same as that of the power converter 1 described above, and thus the detailed descriptions thereof are omitted herein. The controller 11 performs a balance voltage control method to operate each power converter, and the balanced voltage control method is the same as the method employed by the controller 11 for operating the power converter 1 in the foregoing embodiments, thus the detailed descriptions thereof are omitted herein. In addition, in each power converter (1a, 1b, 1c), the first terminal of the third switch (SW3a, SW3b, SW3c) is electrically connected to the second terminal of the second switch (SW2a, SW2b, SW2c) to form an output terminal, and the output terminal of each power converter (1a, 1b, 1c) is electrically coupled to a load (La, Lb, Lc).

In summary, the present disclosure provides a power converter and a multi-level power conversion system in which the dead time of switch is controlled according to the capacitor voltage of the flying capacitor so that the capacitor voltage of the flying capacitor is maintained within a balance voltage range. Further, since the direction of the current in the power converter during the dead time would determine the succeeding switching state, the present disclosure does not need to detect the current direction and control the switching state actively.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power converter, comprising:
a first switch, a second switch, a third switch and a fourth switch, wherein a first terminal of the second switch is electrically connected to a second terminal of the first switch, a first terminal of the third switch is electrically connected to a second terminal of the second switch, and a first terminal of the fourth switch is electrically connected to a second terminal of the third switch;
a flying capacitor, wherein a positive terminal of the flying capacitor is electrically connected to the first terminal of the second switch, and a negative terminal of the flying capacitor is electrically connected to the second terminal of the third switch; and
a controller, operating the first and fourth switches to perform a first complementary switching with a first dead time, and operating the second and third switches to perform a second complementary switching with a second dead time,
wherein a first terminal of the first switch and a second terminal of the fourth switch are electrically connected to a DC input source,
wherein the controller determines to regulate the first or second dead time by detecting a capacitor voltage of the flying capacitor, such that the capacitor voltage of the flying capacitor is maintained within a balance voltage range.

2. The power converter according to claim 1, wherein the controller is configured to:
compare the capacitor voltage of the flying capacitor with a first predetermined voltage;
determine that the flying capacitor is undervoltage if the capacitor voltage is lower than the first predetermined voltage; and
regulate the second dead time to charge the flying capacitor when the flying capacitor is undervoltage.

3. The power converter according to claim 2, wherein the controller is further configured to:
determine that the flying capacitor is overvoltage if the capacitor voltage is higher than the first predetermined voltage; and
regulate the first dead time to discharge the flying capacitor when the flying capacitor is overvoltage.

4. The power converter according to claim 1, wherein the controller is configured to:
generate a first triangle wave and a second triangle wave which are out of phase with each other by 180 degrees; and
compare the first and second triangle waves with a carrier wave to generate a PWM signal for selectively turning on or off the first, second, third and fourth switches,
wherein if the carrier wave is greater than a second predetermined voltage, the first and second switches are not turned off simultaneously in a switching time sequence.

5. The power converter according to claim 4, wherein if the carrier wave is less than the second predetermined voltage, the first and second switches are turned off simultaneously in at least a part of the switching time sequence.

6. The power converter according to claim 1, wherein the first dead time and the second dead time do not overlap with each other.

7. The power converter according to claim 1, wherein the DC input source comprises a series capacitor, a positive terminal of the series capacitor is electrically connected to the first terminal of the first switch, and a negative terminal of the series capacitor is electrically connected to the second terminal of the fourth switch.

8. The power converter according to claim 1, wherein the second terminal of the second switch and the second terminal of the fourth switch are electrically coupled to a load.

9. The power converter according to claim 1, wherein the first and fourth switches are turned off simultaneously during the first dead time, and the second and third switches are turned off simultaneously during the second dead time.

10. A multi-level power conversion system, configured for switching a DC input source, and comprising:
a plurality of power converters, each comprising:
a first switch, a second switch, a third switch and a fourth switch, wherein a first terminal of the second switch is electrically connected to a second terminal of the first switch, a first terminal of the third switch is electrically connected to a second terminal of the second switch, a first terminal of the fourth switch is electrically connected to a second terminal of the third switch, and a first terminal of the first switch and a second terminal of the fourth switch are electrically connected to the DC input source; and a flying capacitor, wherein a positive terminal of the flying capacitor is electrically connected to the first terminal of the second switch, and a negative terminal of the flying capacitor is electrically connected to the second terminal of the third switch; and a controller, wherein regarding each of the plurality of power converters, the controller is configured to:

operate the first and fourth switches to perform a first complementary switching with a first dead time;

operate the second and third switches to perform a second complementary switching with a second dead time; and determine to regulate the first or second dead time by detecting a capacitor voltage of the flying capacitor, such that the capacitor voltage of the flying capacitor is maintained within a balance voltage range.

11. The multi-level power conversion system according to claim 10, wherein regarding each of the plurality of power converters, the controller is further configured to:

compare the capacitor voltage of the flying capacitor with a first predetermined voltage;

determine that the flying capacitor is undervoltage if the capacitor voltage is lower than the first predetermined voltage; and regulate the second dead time to charge the flying capacitor when the flying capacitor is undervoltage.

12. The multi-level power conversion system according to claim 11, wherein regarding each of the plurality of power converters, the controller is further configured to:

determine that the flying capacitor is overvoltage if the capacitor voltage is higher than the first predetermined voltage; and regulate the first dead time to discharge the flying capacitor when the flying capacitor is overvoltage.

13. The multi-level power conversion system according to claim 10, wherein regarding each of the plurality of power converters, the controller is further configured to:

generate a first triangle wave and a second triangle wave which are out of phase with each other by 180 degrees; and compare the first and second triangle waves with a carrier wave to generate a PWM signal for selectively turning on or off the first, second, third and fourth switches, wherein if the carrier wave is greater than a second predetermined voltage, the first and second switches are not turned off simultaneously in a switching time sequence.

14. The multi-level power conversion system according to claim 13, wherein regarding each of the plurality of power converters, if the carrier wave is less than the second predetermined voltage, the first and second switches are turned off simultaneously in at least a part of the switching time sequence.

15. The multi-level power conversion system according to claim 10, wherein in each of the plurality of power converters, the first terminal of the third switch is electrically connected to the second terminal of the second switch to form an output terminal electrically coupled to a load.

* * * * *